Dec. 8, 1936.  E. WIRZ  2,063,213
LID LOCKING DEVICE
Filed May 7, 1935  2 Sheets-Sheet 1
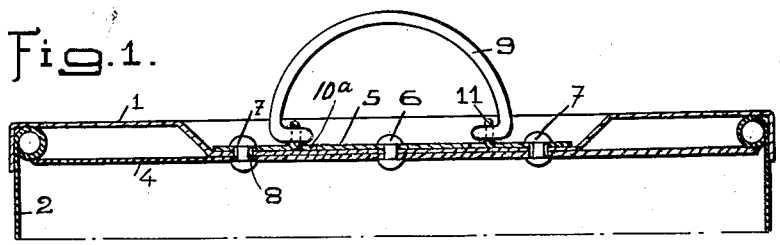
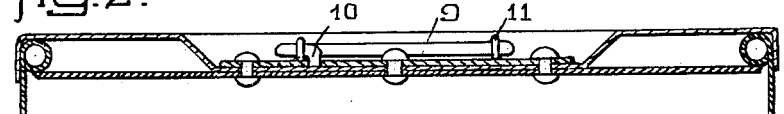
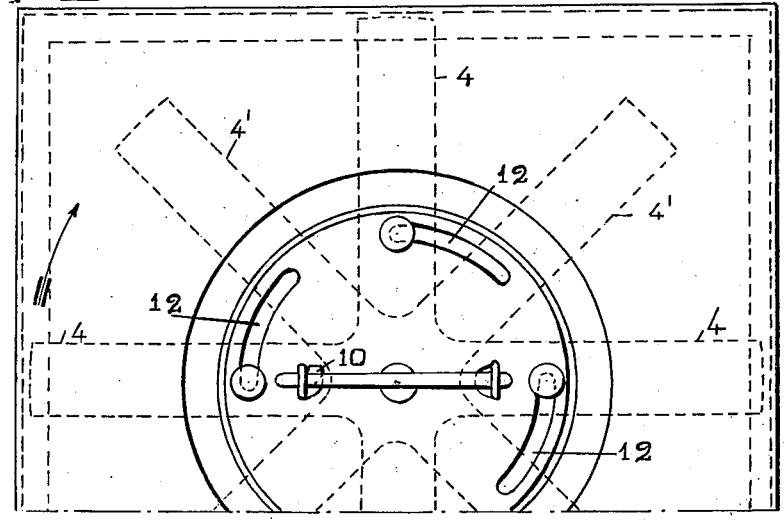
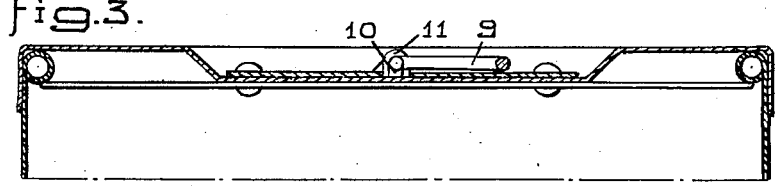
INVENTOR.
Emil Wirz
BY ................ ATTYS.

Dec. 8, 1936.  E. WIRZ  2,063,213
LID LOCKING DEVICE
Filed May 7, 1935  2 Sheets-Sheet 2
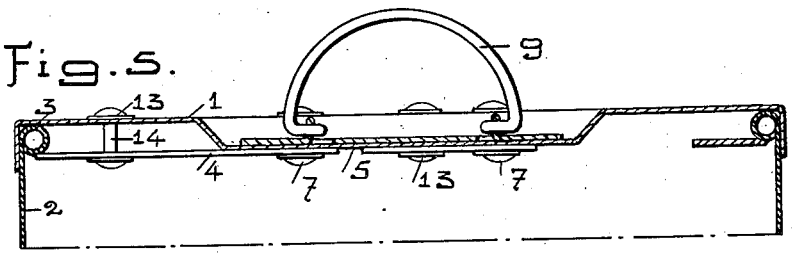
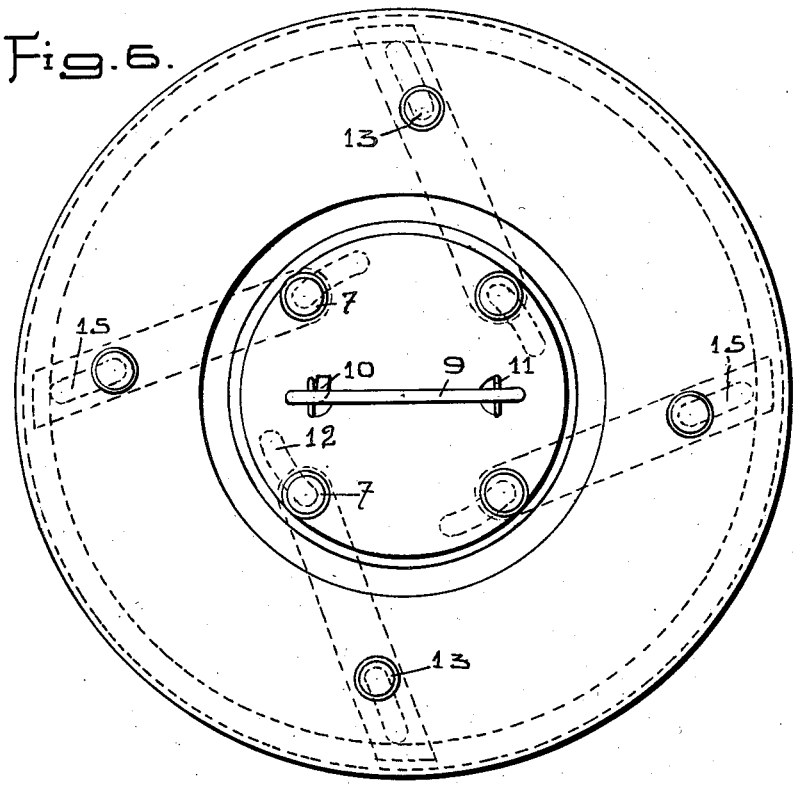
INVENTOR.
Emil Wirz
BY _____ ATTYS Patented Dec. 8, 1936

2,063,213

UNITED STATES PATENT OFFICE 2,063,213

LID LOCKING DEVICE

Emil Wirz, Basel, Switzerland

Application May 7, 1935, Serial No. 20,180
In Switzerland April 23, 1934

2 Claims. (Cl. 220—57)

The present lid locking device is differentiated from known devices by the fact that it contains in itself all of the locking elements which effect a secure connection between the lid and the receptacle or the wall of the receptacle, and that thus hinges, hoops and other locking devices are avoided. The present device is characterized by the fact that by moving a handle at least one bolt is operated and presses the lid against the edge of the opening so that the lid in the closed position is secured against opening of its own accord.

The accompanying drawings depict two examples of construction of the object of the invention.

Fig. 1 is a cross-section through a receptacle in closed and locked position but with the locking mechanism not in action, that is to say with the handle raised.

Fig. 2 shows the same section but with the locking mechanism in action, that is to say with the handle pressed down.

Fig. 3 shows a section of the receptacle turned through 90°, with the locking mechanism in action.

Fig. 4 shows a receptacle in plan-view with the lid in position.

Figs. 5 and 6 depict the lid locking device in an application, by way of example, to cylindrical receptacles. Fig. 5 is a section through the longitudinal axis of the receptacle.

Fig. 6 is a plan-view.

As can be seen from the drawings, the lid 1 sits on the receptacle 2 fitted with a turned-over edge 3 and is held in position by the bolts 4. These bolts 4, forming a cross in the present example, can turn around the axis 6 and are secured by rivets 7 to the exterior centre disc 5. The distance tubes 8 are of such dimensions that the rivets can be made firm but that nevertheless the friction in the locking mechanism does not hinder the easy movement of the bolts. These distance tubes slide in slots 12 in the lid, which slots guide them and limit their movements. The centre disc 5 is fitted with a handle 9 which can be turned up or down and is mounted in bent-over lugs 11. When turned up this handle serves not only for carrying purposes but also as a turning member. When the handle is pushed down its projection 10 engages in a recess 10a in the centre disc and, the handle acting as a lever, presses bolt and lid close together, therefore locking the bolts. By the oblique position of the projection 10 in accordance with Fig. 3 it is made possible for the handle 9 to be made secure in its lowered position so that the lock cannot be released by accident. The locking can also be fitted with a spring catch released by pressure on a button and this type of lock makes it possible to apply seals without difficulty or to fit a lock with a key or combination mechanism.

Instead of the turning device a sliding device can also of course be used on the same principle. In addition the edge of the receptacle, instead of being turned over, can just be plain or fitted with any desired kind of stop. The ends of the bolts are rounded or slanted off suitably in order to attain a good grip and gradually increasing pressure from the bolts.

In the example of application to cylindrical containers the lid 1 is also pressed on to the rolled edge 3 of the receptacle 2 by the bolts 4. As in the preceding example the bolts 4 are operated by turning the handle 9 which is mounted in lugs 11 on the centre disc 5. The centre disc 5 and bolts 4 are joined by means of rivets 7 which slide in the guide slots 12 in the lid and serve at the same time as axes of rotation for the bolts. The bolts for their part are provided with guide slots 15 by means of which they are guided around the rivets 13, secured to the lid, these acting as axes of oscillation.

From the description it can be seen that the present locking device can be adapted to both regular and irregular lid shapes and can be used for lids on any kind of receptacle. If the nature of the material stored in the receptacle makes it desirable, the bolts can also be mounted on the outer side of the lid.

I claim:—

1. A lid locking device fitted to a tin, comprising a plurality of bolts beneath a lid member, a revoluble disc mounted on the lid, slots in the lid, rivets connecting the bolts with said disc, said rivets passing through said slots, and a handle pivotally carried by the disc, said bolts engaging retaining means on the tin.

2. A lid locking device fitted to a tin, comprising a plurality of tangential bolts beneath a lid member, a revoluble disc mounted on the lid, slots in the lid, rivets connecting the bolts with said disc, said rivets passing through said slots, a handle pivotally carried by the disc, guide studs carried by the lid, and slots in the bolts, said studs engaging in said slots and said bolts engaging retaining means on the tin.

EMIL WIRZ.